Sept. 26, 1967   P. SCHRAUDENBACH   3,343,468
PAVING BLOCK
Filed May 13, 1965

INVENTOR
PAUL SCHRAUDENBACH
BY Dicke + Craig
ATTORNEYS

United States Patent Office 3,343,468
Patented Sept. 26, 1967

3,343,468
PAVING BLOCK
Paul Schraudenbach, 53A Agnes-Bernauer-Strasse,
Munich 42, Germany
Filed May 13, 1965, Ser. No. 455,369
Claims priority, application Germany, May 14, 1964,
Sch 35,163
8 Claims. (Cl. 94—11)

The present invention relates to a paving block, preferably of concrete, of the type as described and claimed in my copending application, Ser. No. 331,417, filed on Dec. 18, 1963, now Patent No. 3,301,148, and which consists of several parallel bar-shaped tread members which are provided with transverse recesses or grooves at least in the upper side thereof and are separated from each other by channellike apertures which extend entirely through the paving block from the upper to the lower side thereof, and of parallel webs which extend transversely to, and connect the tread members to each other.

Such grooved paving blocks as well as similar paving blocks without transverse grooves which have also been developed by me have proved very successful, especially for supporting parking vehicles, because the areas which are covered with these blocks will withstand very heavy loads and, if grass is sown in the ground which fills out the apertures between the tread members, these entire areas when seen from a certain distance will have the appearance of an unbroken lawn, even though the upper surfaces of the tread members may actually not be covered with grass. However, even these grooved paving blocks still have one disadvantage, namely, that the surfaces of the grooves in the tread members extend at a uniform level from one aperture to another and also form parts of the upper surfaces of the transverse connecting webs. Consequently, the humus which, after the paving blocks are layed, is heaped thereon and is then uniformly spread by brooms into the apertures and grooves, forms such thin humus layer in the areas above the relatively shallow grooves and above the connecting webs that there is no sufficient connection between this layer and the humus within the apertures to permit the grass seeds which are sown within these areas to find sufficient nourishment and to form a proper sod. Especially during a longer dry period, the grass roots which are formed in these grooved areas and above the transverse webs will starve and the grass will dry up so that bare spots will form in the areas above the grooves and long bare strips in the areas above the connecting webs, the upper surfaces of which are level with the surfaces of the grooves.

It is an object of the present invention to overcome this disadvantage of the paving blocks of the type as above described and to design them in a manner so as to permit a permanent and connected sod layer to form not only within the apertures between the adjacent tread members but also either within the grooved areas and above the transverse connecting webs or, if the bar-shaped tread members of the paving blocks are not provided with transverse grooves, within recesses in the longitudinal upper edge portions of the tread members.

For attaining this object, the present invention provides that the longiudinal edges between the upper surfaces of the bar-shaped tread members and the surfaces of the intermediate apertures are at least broken away or rounded off at various points or that in a grooved paving block at least the edges between the grooves and the walls of the apertures between the tread members are strongly chamfered, broken away, or rounded off.

In order to increase the desired effect, the invention further provides that the upper edges of the transverse connecting webs between the adjacent bar-shaped tread members are located at a considerably lower level than the upper surfaces of the tread members and that, if in a grooved paving block the grooves are located directly above the connecting webs, the upper surfaces of the connecting webs are not level with the bottom of the grooves as in my previous grooved paving blocks, but are also vertically spaced from the lowest points of the grooves. Furthermore, the upper surfaces of the connecting webs are preferably rounded off and the highest points of these rounded surfaces should be disposed within the central vertical plane between the lateral sides of the connecting webs. Therefore, since the upper surface of each connecting web is now located below the level of the transverse grooves, it is not of a concave or grooved shape but convex, and its highest point lies centrally between its lateral surfaces. In order to prevent the stability of the paving block from being reduced because the connecting webs are made of a lower height, it is advisable to increase the width of the webs gradually in the downward direction.

The features and advantages of the present invention will become more clearly apparent from the following detailed description thereof which is to be read with reference to the accompanying drawings, in which:

FIGURE 3 shows a cross section which is likewise taken along the line A–B of FIGURE 1, but illustrates a modification of the invention; while

Figure 1:
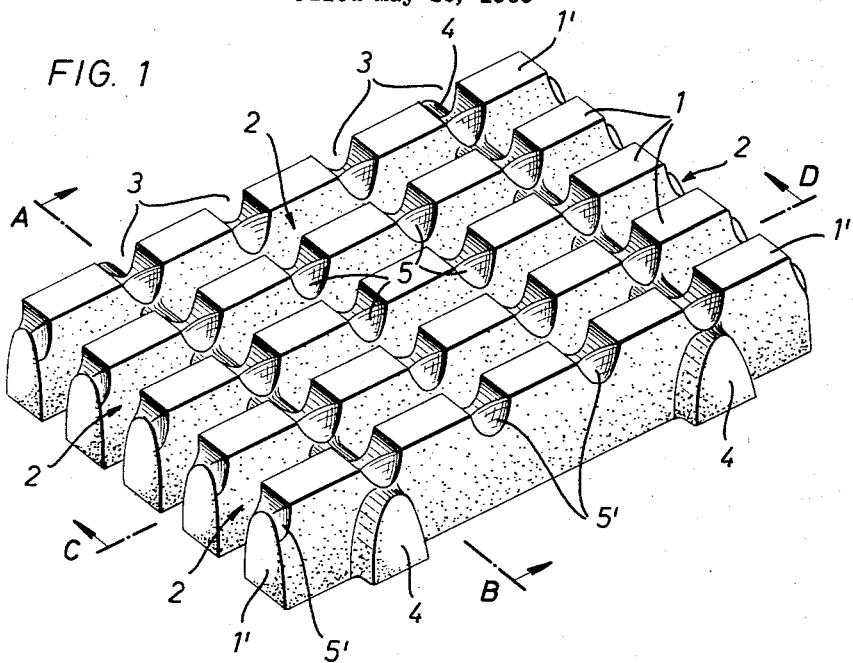
FIGURE 1 shows a perspective view of a paving block according to the present invention in which the upper surfaces of the bar-shaped tread members are provided with transverse grooves, the edges of which are strongly chamfered or broken away, and in which the transverse connecting webs are rounded at their upper ends.
Figure 2:
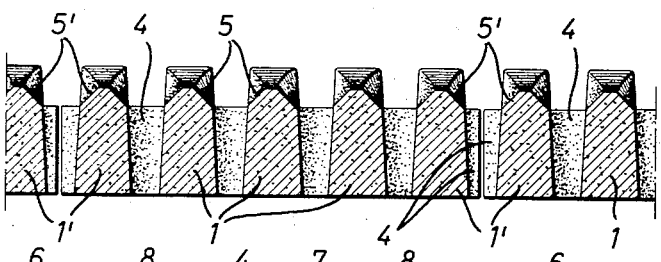
FIGURE 2 shows a cross section which is taken along the line A–B of FIGURE 1.

Referring first particularly to FIGURE 1 of the drawings, the paving block according to the invention forms an integral unit which consists, for example, of five bar-shaped tread members 1 of an upwardly tapering cross section which extend parallel to each other and are separated by channel like apertures 2 which extend entirely through the paving block from the upper to the lower side thereof and gradually decrease in width in the downward direction in accordance with the tapered shape of the tread members 1. Each of these apertures 2 therefore has a substantially trapezoidal cross section in which the longer of the two parallel sides is located within the plane of the upper side of the paving block. Of course, these apertures 2 may also have a different cross-sectional shape. For example, each aperture 2 may have a shape of an inverted trapeze which terminates at its upper end into a rectangular shape, the opposite walls of which have strongly chamfered, broken-away or strongly rounded upper edges at least at several points.

The upper surfaces of the tread members 1 are interrupted by transverse recesses or grooves 3, the greatest depth of which is smaller than the thickness of the tread members. If desired, the lower surfaces of the tread members may also be provided with grooves similar to the grooves 3.

All of the tread members 1 are connected to each other by transverse webs 4 which may extend within the same vertical planes in which the grooves 3 are located, although this is not a necessary requirement. The particular paving block as illustrated in FIGURE 1 is provided with four grooves 3 and two connecting webs 4. Each connecting web 4 projects slightly beyond the lateral outer surfaces of the two outer tread members 1', namely, by a distance which is equal to one half of the space between two adjacent tread members. Consequently, when two paving blocks are placed adjacent to each other, three further apertures will be formed between them. Although paving blocks of the particular design as above described have proved especially successful, the number of tread members and grooves in each paving block is optional, and the grooves may also be provided at other points than shown in FIGURE 1.

Figure 4:
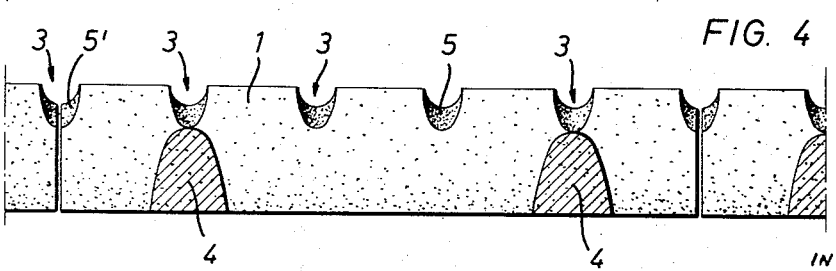
FIGURE 4 shows a cross section which is taken along the line C–D of FIGURE 1.

The present invention now provides that at least the edges of the recesses or grooves 3 in the paving block facing the apertures 2 are strongly chamfered or broken away so as to be fluted, as illustrated at 5 in FIGURES 1 and 4. In addition, the edges of the grooves 3 in the lateral outer surfaces of the two outer tread members 1' may also be chamfered or broken away, as indicated at 5'.

Figure 3:
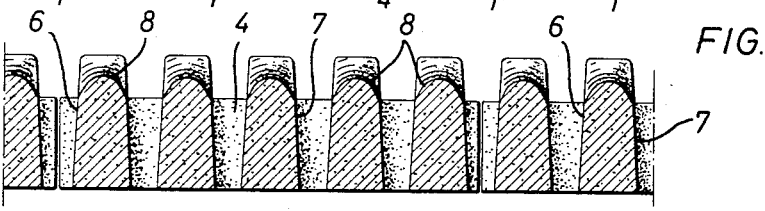

Although for the purposes of the invention it is sufficient if merely the mentioned edges are broken away, it is advisable also to mold the lateral surfaces 6 and 7 of each tread member 1 underneath a groove 3 so as to be connected with each other by a curved surface 8, as shown in FIGURE 3. Of course, if the tread members 1 project outwardly beyond the connecting webs 4, as shown in FIGURES 1 and 4, the half grooves 3 which are then formed at the outer ends of the tread members should likewise be strongly chamfered or broken away so as to be fluted. Furthermore, as illustrated in FIGURE 3, the edges between the lateral surfaces and the upper surfaces of the tread members 1 should also be chamfered or more preferably rounded so as to permit the grass within the apertures 2 and growing to a higher level than that of the upper surfaces of the tread members 1 to bend over these edges when a car is moved over the paving blocks, rather than to be kinked or cut off by the pressure of the tires.

The connecting webs 4 are preferably made of a curved shape so as to provide sufficient spaced to allow the grass which is growing in the openings 2 between them to bend over gradually without danger of kinking when a car drives over this paving black. The danger of such kinking of the grass blades by the edges of the connecting webs is relatively small also because the upper surfaces of the webs 4 are so much lower than the upper surfaces of the tread members 1 that the tires of a car will not come in contact with them and will therefore also not mash the grass thereon. The grass between the connecting webs has therefore sufficient room to yield between the tires and the connecting webs without being kinked or cut off by the tires. In order to compensate for the reduction in height of the connecting webs, these webs preferably gradually increase in width considerably toward their lower ends. The solidity and strength of the connecting webs may therefore be made just as great as or even greater than that of relatively narrow webs which extend up to the level of the grooves 3 or even up to the upper surfaces of the tread members 1. The connetcing webs 4 are, however, not required to have the particular cross-sectional shape as illustrated in FIGURES 1 and 4, but may be of any other desired shape, as long as they comply with the requirements as stated above.

If the paving blocks are not provided with transverse grooves in their upper surfaces, they should be designed in accordance with the same principles as described with reference to grooved paving blocks. The upper longitudinal edges of the tread members should then be strongly chamfered or broken away at various points so as to permit sod to be formed also within the recesses which are thus attained.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A paving block comprising a plurality of bar-shaped, parallel tread members spaced from each other, a plurality of parallel connecting webs interconnecting said tread members and extending transverse thereto, said connecting webs being spaced from each other in a manner such that said spaced tread members and said spaced connecting webs form intermediate apertures extending entirely through the block from the top to the bottom surface thereof, at least the upper surface of said tread members being broken away at appropriate points so as to form a plurality of spaced apart transverse grooves, the bottom of each groove having a narrow central longitudinal portion and downwardly slanting chamfered portions on each side of said central portion which merge into the side surfaces of said tread members to promote the growth of grass in said grooves upon said intermediate apertures being substantially filled with soil and grass being sowed thereon so as to form sod.

2. A paving block as defined in claim 1, in which the upper edges of said connecting webs are rounded off.

3. A paving block as defined in claim 1, in which the upper surfaces of said connecting webs are located considerably below the level of the upper surfaces of said tread members.

4. A paving block as defined in claim 1, in which at least some of said connecting webs are located substantially in vertical alignment with at least some of said grooves, and the upper surfaces of said connecting webs are located considerably below the level of the upper surfaces of said tread members, the lowest points of said chamfered portions of said tranverse grooves terminating into the side surfaces of said tread member and being located at substantially the same letvel as the level of the highest points of said connecting webs, said highest points of each connecting web being located within the central vertical plane between the side walls of said web.

5. A paving block as defined in claim 1 wherein the sides of the parallel tread members taper inwardly from the bottom to the top surface thereof whereby the intermediate apertures gradually increase in cross section from the bottom to the top.

6. A paving block as defined in claim 4, wherein the sides of the parallel tread members taper inwardly from the bottom to the top surface thereof whereby the intermediate apertures gradually increase in cross section from the bottom to the top.

7. A paving block comprising a plurality of bar-shaped, parallel tread members spaced from each other having at least one transverse groove formed in at least the upper surface thereof, and a plurality of parallel webs spaced from each other and extending transverse to said tread members and connecting said tread members to each other, the edges between said grooves and the side walls of said tread members being broken away so as to form downwardly slanting chamfered portions, the bottom of each groove having a narrow central longitudinal portion with the downwardly slanting chamfered portions being located on each side of said central portion so as to merge into the side surfaces of said tread members to promote the growth of grass in said grooves upon the space intermediate said tread members and webs being substantially filled with soil and grass being sowed thereon so as to form sod.

8. A paving block defined in claim 7, wherein the sides of the parallel tread members taper inwardly from the bottom to the top surface thereof whereby the intermediate apertures gradually increase in cross section from the bottom to the top.

References Cited

UNITED STATES PATENTS

| | | | |
|---|---|---|---|
| 12,172 | 1/1855 | Warner | 94—13 |
| 55,489 | 6/1866 | Groat | 52—669 |
| 155,992 | 10/1874 | Snow | 94—5 X |
| 305,328 | 9/1884 | Peck | 94—4 X |
| 2,210,150 | 8/1940 | Notari | 94—13 |

JACOB L. NACKENOFF, *Primary Examiner.*